F. L. O. WADSWORTH.
GLASS STORAGE BATTERY CASE.
APPLICATION FILED JULY 27, 1907.
938,445.
Patented Oct. 26, 1909.
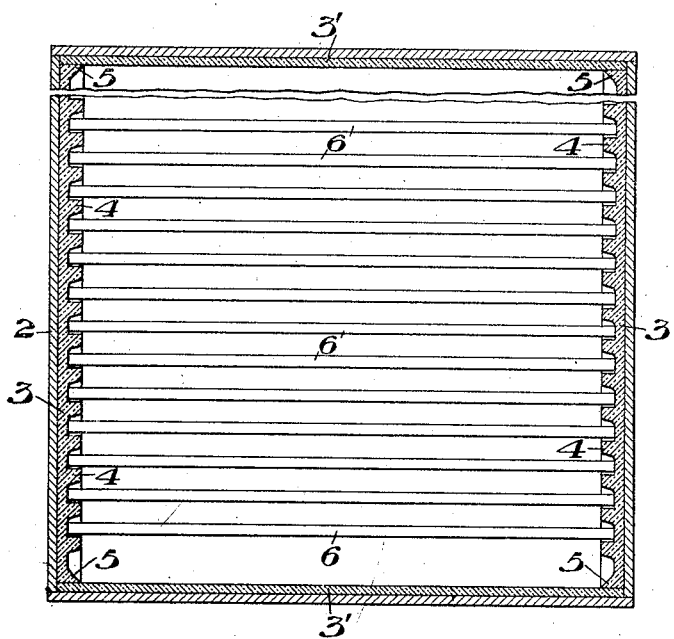
WITNESSES
INVENTOR

UNITED STATES PATENT OFFICE.

FRANK L. O. WADSWORTH, OF SEWICKLEY, PENNSYLVANIA, ASSIGNOR TO PRESSED PRISM PLATE GLASS COMPANY, OF NEW YORK, N. Y., A CORPORATION OF WEST VIRGINIA.

GLASS STORAGE-BATTERY CASE.

938,445.      Specification of Letters Patent.      Patented Oct. 26, 1909.

Application filed July 27, 1907. Serial No. 385,850.

*To all whom it may concern:*

Be it known that I, FRANK L. O. WADSWORTH, of Sewickley, Allegheny county, Pennsylvania, have invented a new and useful Glass Storage-Battery Case, of which the following is a full, clear, and exact description, reference being had to the accompanying drawing, which shows in sectional plan view a storage battery embodying my invention.

My invention relates to a lining for storage battery cases formed of glass and having integral projections on the inner surface forming devices for holding and spacing the battery-grids or elements. A battery thus constructed is of great advantage, for it is extremely simple in its construction, it enables the battery elements to be spaced apart effectively without tying them together, and all the parts of the lining being made of glass, it affords the most favorable conditions for receiving and holding the battery elements and the liquid.

In the drawing 2 represents the battery case provided with a lining composed of glass slabs or plates 3 having integral parallel grid or partition supports 4. Some of the plates have projecting margins 5 so that they will make a tight joint. The plates which are provided with these projecting margins are preferably those on which the supports 4, 4 are formed, and they are fitted against plain plates 3' as shown. The supports may extend to and be made integral with at least one of the marginal projections, since in this way the strongest possible construction is secured. The projections on the glass plate or slabs are preferably formed by rolling a mass of glass into a sheet and then bringing upon the same a die which by forcible pressure molds the projections thereon. This gives a plate which is free from internal strains and which has characteristics which enable it to withstand changes of temperatures which would crack the ordinary plate made by a pressing operation alone. Such changes of temperature are frequently met with in batteries, due not only to the heat generated in mixing the battery fluids, but also to the passage of heavy currents. The parts of the lining are secured together and the storage battery grids or elements 6 are placed between the supports 4 and are held thereby in vertical position.

The ribs or supports 4 are preferably of trapezoidal form in cross section, as shown, thus giving the battery elements clearance in the intervening grooves. This not only prevents sticking of the elements or grids and facilitates their removal and insertion, but also relieves strains due to buckling of the elements.

The form of the projections and the marginal form of the plates may be changed, since

What I claim is:—

1. A storage battery cell having therein at opposite sides separate sheets of glass having each a plurality of parallel ribs pressed therein, said ribs being of less thickness at their outer edges than at their bases; substantially as described.

2. A storage battery cell having therein at opposite sides separate sheets of glass, each formed in one integral piece and having each a plurality of parallel ribs therein, said ribs or supports being of trapezoidal form in cross section, substantially as described.

In testimony whereof, I have hereunto set my hand.

FRANK L. O. WADSWORTH.

Witnesses:
H. M. CORWIN,
JOHN MILLER.